United States Patent
Helfen et al.

(10) Patent No.: US 10,099,440 B2
(45) Date of Patent: *Oct. 16, 2018

(54) METHOD OF LASER CLEANING A TIRE INNER SURFACE, AND A TIRE

(71) Applicant: THE GOODYEAR TIRE & RUBBER COMPANY, Akron, OH (US)

(72) Inventors: Thomas Benedikt Helfen, Wincheringen (DE); Jean-Claude Patrice Philippe Griffoin, Mertzig (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 343 days.

This patent is subject to a terminal disclaimer.

(21) Appl. No.: 14/955,294

(22) Filed: Dec. 1, 2015

(65) Prior Publication Data

US 2017/0151737 A1   Jun. 1, 2017

(51) Int. Cl.
*B29D 30/00* (2006.01)
*B23K 26/402* (2014.01)
(Continued)

(52) U.S. Cl.
CPC ........ *B29D 30/0005* (2013.01); *B08B 7/0042* (2013.01); *B23K 26/402* (2013.01);
(Continued)

(58) Field of Classification Search
CPC ............ B29D 30/0005; B29D 30/0681; B29D 30/0685; B29D 30/0061; B23K 26/402; B60C 5/14; B08B 7/0042
See application file for complete search history.

(56) References Cited

U.S. PATENT DOCUMENTS 5,478,426 A   12/1995   Wiler et al.
6,369,353 B1 *   4/2002   Soska .................. B08B 7/0042
                                            219/121.68

(Continued)

FOREIGN PATENT DOCUMENTS

DE   102012105015 A1   12/2013
DE   202012104243 U1   3/2014

(Continued)

OTHER PUBLICATIONS

European Search Report dated Jan. 30, 2017 for Application Serial No. EP16199235.
Office Action dated Jan. 8, 2018 from U.S. Appl. No. 14/955,295.

*Primary Examiner* — Mathieu D Vargot
(74) *Attorney, Agent, or Firm* — John D. DeLong

(57) ABSTRACT

The present invention is directed to a method of cleaning an innermost surface of a pneumatic tire, the surface having a residue deposited thereon, comprising the steps of: activating a laser to generate laser radiation; directing a pulse of laser radiation to impinge on an area of the innermost surface, the pulse of radiation having a pulse width and a fluence sufficient to remove at least part of the residue in the area to form a cleaned area; repeating the step of directing the pulse of radiation sequentially over the innermost surface to form a sequence of cleaned areas, the sequence of cleaned areas defining a stripe, the stripe following a continuous nonlinear path extending at least one circumference about the inner surface, the stripe having a stripe width W2. The invention is further directed to a tire made by the method.

14 Claims, 3 Drawing Sheets

(51) Int. Cl.
  *B29D 30/06* (2006.01)
  *B60C 5/14* (2006.01)
  *B08B 7/00* (2006.01)
  *B23K 103/00* (2006.01)

(52) U.S. Cl.
  CPC ..... *B29D 30/0061* (2013.01); *B29D 30/0681* (2013.01); *B29D 30/0685* (2013.01); *B60C 5/14* (2013.01); *B23K 2103/30* (2018.08); *B29D 2030/0077* (2013.01); *B29D 2030/0682* (2013.01); *B29D 2030/0686* (2013.01)

(56) References Cited

U.S. PATENT DOCUMENTS

| | | |
|---|---|---|
| 6,726,012 B2 | 4/2004 | Bielicki et al. |
| 6,915,826 B2 | 7/2005 | Poling et al. |
| 7,772,521 B2 | 8/2010 | Smith, Jr. et al. |
| 8,442,670 B2 | 5/2013 | Chebli et al. |
| 8,972,035 B2 | 3/2015 | Hair, Jr. et al. |
| 2003/0155058 A1 | 8/2003 | Saito |
| 2005/0274448 A1* | 12/2005 | Lettieri ................. B08B 13/00 156/110.1 |
| 2010/0243127 A1 | 9/2010 | Chebli et al. |

FOREIGN PATENT DOCUMENTS

| | | |
|---|---|---|
| DE | 102013220066 | 12/2014 |
| EP | 1593121 A2 | 11/2005 |
| EP | 2674287 A1 | 12/2013 |
| EP | 3085523 A1 | 10/2016 |
| WO | 2007101112 A1 | 9/2007 |
| WO | 2017082162 A1 | 5/2017 |

* cited by examiner

METHOD OF LASER CLEANING A TIRE INNER SURFACE, AND A TIRE

BACKGROUND

An innerliner for a pneumatic tire is typically formed from either a compound containing a major proportion by weight of a halobutyl rubber. Before the tire is cured, the entire original inner surface of the innerliner and/or the outer surface of a shaping bladder used in the curing press is coated with a release agent. The release agent is commonly referred to as a "lining cement" when used on the surface of the innerliner; and, to a "bladder lube" or "bladder spray" when used on the shaping bladder. The release agent facilitate removal of the cured tire from the curing mold.

It is often desirable to adhere material to the innerliner surface of a cured tire. For example, polyurethane foam may adhered to the innerliner to provide damping of cavity resonance noise, see for example US 2013/0032262. Electronic devices such as antennae, pressure monitors, or the like may installed, see for example U.S. Pat. No. 7,332,047. Sealant materials may be installed, see for example U.S. Pat. No. 4,359,078. In each case, in order to obtain good adhesion to the innerliner surface, it is sometimes desirable to remove the release agent from the innerliner surface.

Laser cleaning of tire innerliner surfaces has been disclosed, see for example U.S. Publication 2005/0274448. Laser cleaning can be time intensive. It has now been found that selective cleaning of the innerliner surface with a laser in a specific pattern can facilitate good adhesion to the innerliner while greatly reducing the time required to sufficiently clean the surface.

SUMMARY

The present invention is directed to a method of cleaning an innermost surface of a pneumatic tire, the surface having a residue deposited thereon, comprising the steps of: activating a laser to generate laser radiation; directing a pulse of laser radiation to impinge on an area of the innermost surface, the pulse of radiation having a pulse width and a fluence sufficient to remove at least part of the residue in the area to form a cleaned area; repeating the step of directing the pulse of radiation sequentially over the innermost surface to form a sequence of cleaned areas, the sequence of cleaned areas defining a stripe, the stripe following a continuous nonlinear path extending at least one circumference about the inner surface, the stripe having a stripe width W2.

The invention is further directed to a pneumatic tire having a radially innermost circumferential innerliner surface, the surface comprising first regions covered by a residual material, and a plurality of stripe regions axially bounding the first regions, the stripe regions substantially devoid of the residual material; the stripe regions each having a stripe width; each stripe region circumscribing a nonlinear circumferential path along the innerliner surface; wherein the plurality of continuous nonlinear circumferential stripe regions are disposed in axial sequence across a predetermined axial width.

DESCRIPTION

There is disclosed a method of cleaning an innermost surface of a pneumatic tire, the surface having a residue deposited thereon, comprising the steps of: activating a laser to generate laser radiation; directing a pulse of laser radiation to impinge on an area of the innermost surface, the pulse of radiation having a pulse width and a fluence sufficient to remove at least part of the residue in the area to form a cleaned area; repeating the step of directing the pulse of radiation sequentially over the innermost surface to form a sequence of cleaned areas, the sequence of cleaned areas defining a stripe, the stripe following a continuous nonlinear path extending at least one circumference about the inner surface, the stripe having a stripe width W2.

There is further disclosed a pneumatic tire having a radially innermost circumferential innerliner surface, the surface comprising first regions covered by a residual material, and a plurality of stripe regions axially bounding the first regions, the stripe regions substantially devoid of the residual material; the stripe regions each having a stripe width; each stripe region circumscribing a nonlinear circumferential path along the innerliner surface; wherein the plurality of continuous nonlinear circumferential stripe regions are disposed in axial sequence across a predetermined axial width.

As used herein, "axial", and "axially" refer to the axis of rotation of a tire, "circumferential" and "circumferentially" refers to circumscription of the tire, and "radial" and "radially" refer to a direction perpendicular to the axis of rotation of the tire.

Figure 1:
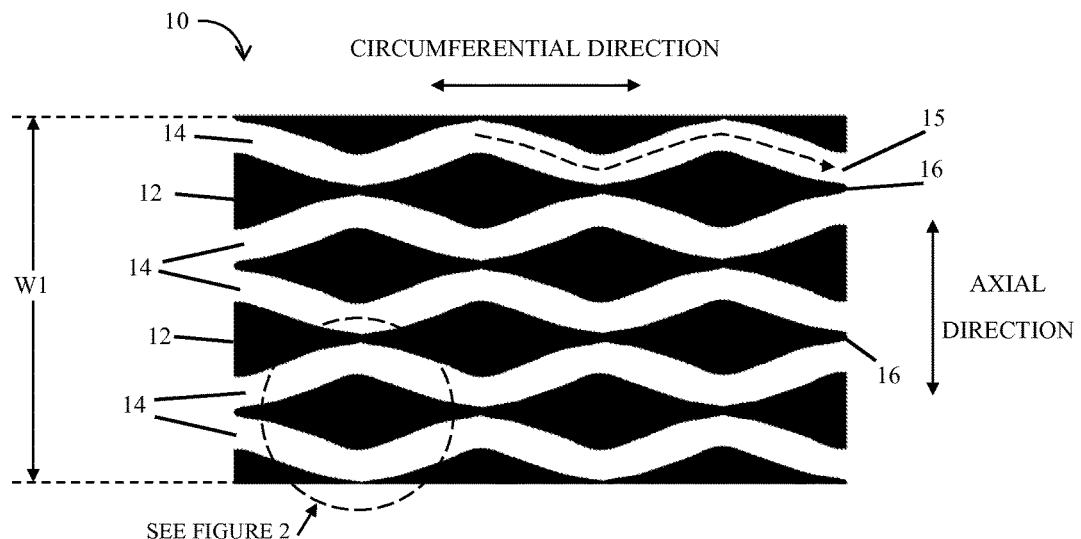
FIG. 1 depicts a laser cleaning pattern on a tire innerliner surface according to the present invention.

With reference now to the drawings, FIG. 1 shows a laser cleaning pattern on a tire innerliner surface (10) according to the present invention. In FIG. 1, regions shown in black represent the innerliner surface (10) covered with residue (12). Such residue may include but is not limited to release agents, dirt, waxes and other rubber compound additives that may have migrated to the innerliner surface. A plurality of nonlinear stripes (14) represent areas of the innerliner surface where residue has been removed by a laser beam from a laser cleaning device (not shown). As indicated, the stripes (14) extend in the circumferentially on surface 10 of the innerliner, and extend circumferentially around the tire innerliner surface (10). As noted, each stripe (14) follows a nonlinear path; in the embodiment of FIG. 1 the stripes are shown following a sinusoidal path (15). Other nonlinear paths may also be used, such as sawtooth and the like. The plurality of stripes (14) are distributed side by side as indicated in the axial direction of the tire innerliner surface (10). In the embodiment shown, the plurality of nonlinear stripes (14) regions are disposed in axial sequence across a predetermined width W1. Adjacent stripes (14) are separated axially by unremoved regions of release agent (12).

Such a predetermined width W1 may correspond to the tread width of the tire, the shoulder-to-shoulder distance of the tire, or the bead-to-bead distance of the tire. The particular width W1 is determined by the subsequent application of the cleaned surface; for example application of a tire sealant may require a width W1 sufficient to seal punctures in the ground contact area of the tire, which may be approximately the tread width or the shoulder to should width, as would be determined by one skilled in the art.

Figure 2:
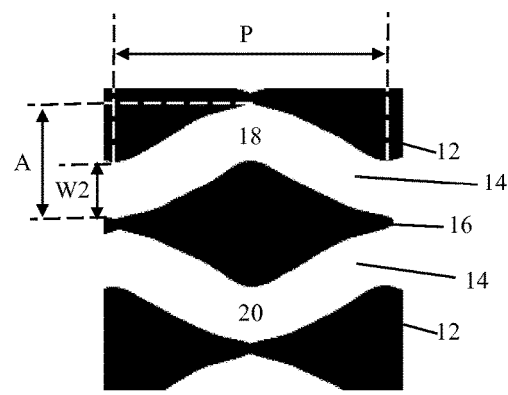
FIG. 2 shows a detail of the pattern of FIG. 1.

FIG. 2 shows a magnified view of the circled region of FIG. 1. As seen in FIG. 2, each stripe (14) has a width (W2).

Following the laser motion path (15) the cleaned stripe (14) defines an amplitude (A) and period (P) characteristic of the laser motion path (15). By laser motion path, it is meant that the path (15) is formed by the relative motion of the laser beam (not shown) on the surface (10); such a motion may be imparted by physically moving the laser beam impinging on a stationary surface (10), or physically moving the surface (10) under a stationary laser beam, or a combination of the two. For example, the laser device may be cycled appropriately in the axial direction over the desired amplitude while the surface (10) rotates with the tire in the circumferential direction in a coordinated manner Axially adjacent stripes (14) are separated by regions of unremoved residue (12), and the unremoved regions have a minimum separation (16) between axially adjacent stripes (14). Axially adjacent stripes may be offset in the circumferential direction; for example as shown in the embodiment in FIGS. 1 and 2, axially adjacent stripes are offset circumferentially by one half of the period (P), with peak (18) of one stripe (14) aligned circumferentially with trough (20) of the adjacent stripe (14).

As noted above, the method herein generates a cleaning pattern with one or more continuous nonlinear stripes of cleaned surface area extending circumferentially about the innermost surface. By continuous nonlinear stripe, it is meant that the laser radiation impinging on the innerliner surface cleans a continuous path on the innerliner surface completely around the circumference of the tire. Further, the path is nonlinear in the sense that if the innerliner is flattened to a planar conformation, the path may be characterized by a period and an amplitude as the path extend circumferentially about the surface and is thus a continuous circumferential stripe. In one embodiment, the continuous nonlinear path is a sinusoidal path having a period and an amplitude. In other embodiments, the continuous nonlinear circumferential path may follow a sawtooth path, a zig-zag path, or the like.

Cleaning of a tire innerliner innermost surface in the manner described above may be done using a method comprising the steps of: activating a laser to generate laser radiation; directing a pulse of laser radiation to impinge on an area of the innermost surface, the pulse of radiation having a pulse width and a fluence sufficient to remove at least part of the residue in the area to form a cleaned area; repeating the step of directing the pulse of radiation sequentially over the innermost surface to form a sequence of cleaned areas, the sequence of cleaned areas defining a stripe, the stripe following a continuous nonlinear path extending at least one circumference about the inner surface, the stripe having a stripe width W2.

Figure 3:
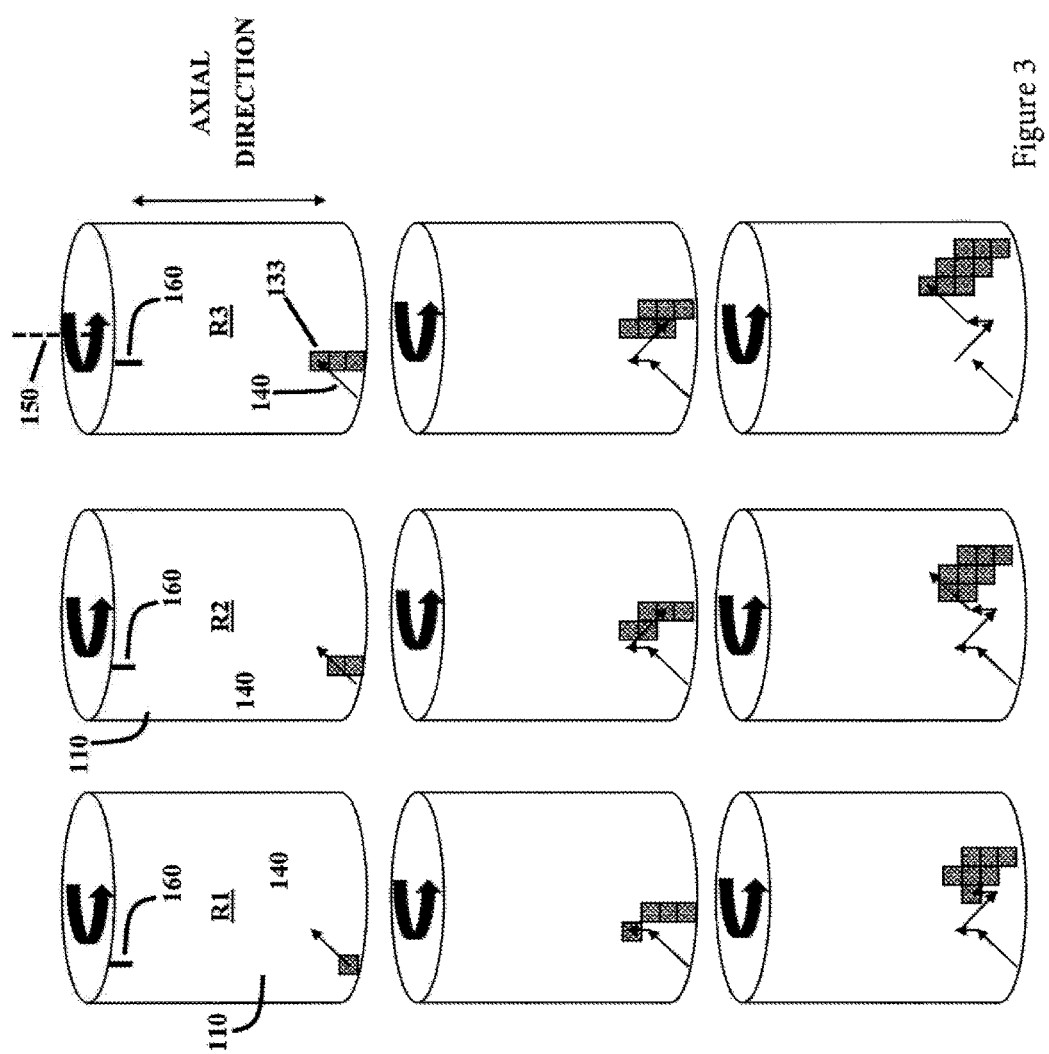
FIG. 3 shows a representation of a sequence of laser cleaning steps on a tire innerliner surface.
Figure 4:
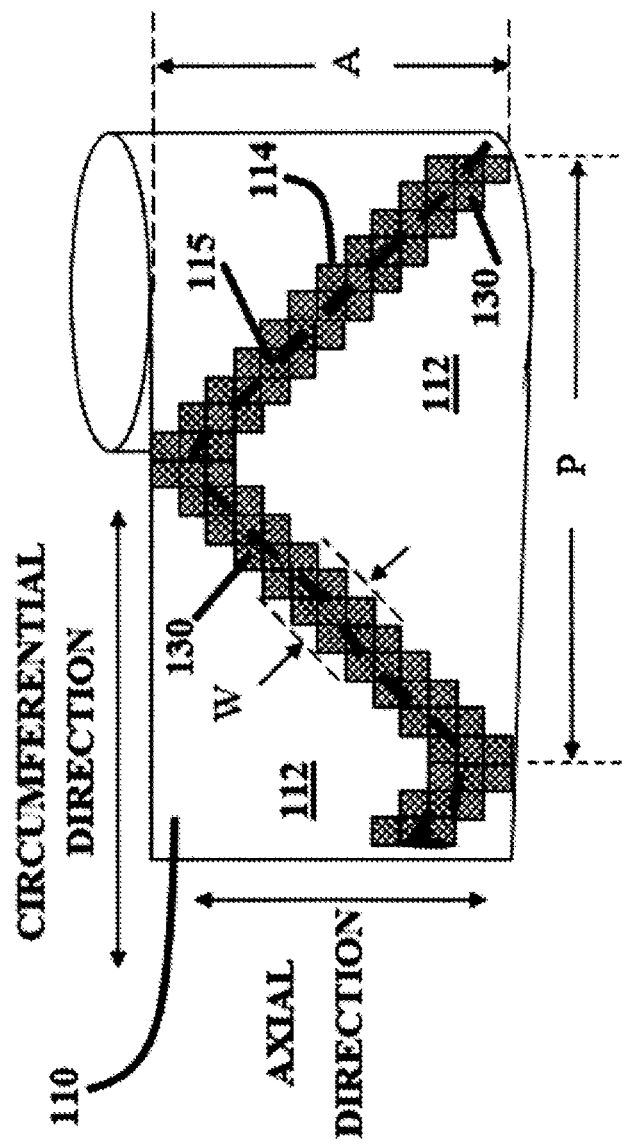
FIG. 4 shows a representation of a cleaned area of a tire innerliner.

FIGS. 3 and 4 illustrate the method for cleaning the innerliner surface, with innermost surface 110 as viewed from a radially outward vantage point.

FIG. 3 shows a series of nine views R1-R9 of innermost surface 110 as it rotates through part of a laser cleaning. In view R1, cleaned area 131 is located at the initial position of the directed laser pulse (not shown) after exposure to the laser beam. Direction arrow 140 indicates the path followed by the laser across surface 110. After one rotational increment in the direction indicated by arrow 150 about the axis 200, view R2 shows cleaned area 132 located incrementally along laser path 140 after exposure to the laser beam. Cleaned area 132 is adjacent cleaned area 131. As is apparent, cleaned areas 131 and 132 are square shaped, having been formed by a laser pulse having a square cross section (not shown). Subsequent views R3 through R9 show the sequential addition of cleaned areas 133-139 as the innersurface 110 incrementally rotates and the laser pulse follows the directional arrow 140, and the gradual definition of the stripe 114.

With reference to FIG. 4, innermost surface 110 is shown as a flattened plane to better illustrate the method, after rotation through a complete period. Stripe 114 includes a sequence of cleaned areas 130 cleaned by the laser. Regions 112 are innermost surface regions covered with residual that have not been cleaned by the laser. Stripe 114 has width W2 and follows nonlinear path 115 (shown as a dashed line) with period P and amplitude A.

The illustrations of FIGS. 3 and 4 are illustrative only. In practice, the number of cleaned areas extend axially across the stripe width will depend on both the stripe width and the pulse width. In one embodiment, the pulse width ranges from 0.25 to 1 mm For example, for a stripe width of 10 mm and a square laser pulse having a pulse with of 0.625 mm, a total of 16 axially adjacent cleaning areas would be needed. The pulse may have a cross sectional area of various shapes, including but not limited to square, circular, and the like.

Progression of the laser pulse along its path may be done in a manner such that the resulting stripe is a continuous winding, with a gradual axial index. In this embodiment, the stripe will be seen as a continuous helical winding around the circumference of the innersurface. Viewed radially over a limited region, the helical winding would appear as a plurality of stripes as seen in FIG. 1. Alternatively, each individual stripes may begin and end at the same position on the innerliner surface, resulting in a plurality of unconnected stripes, in contrast to a continuous helical winding.

The laser pulse following a particular directional path as in FIG. 3 results in cleaned areas adjacent to other cleaned areas. In this embodiment, each cleaned areas is adjacent to at least one other cleaned area. In another embodiment, the laser pulse may at least partially overlap a previously cleaned area, resulting in a full or partial overlap of cleaned areas. Such overlap may be done in a manner to effectively clean the same areas multiple times, to give a more complete removal of the residue.

Devices for cleaning the innerliner surface of a tire with a laser device are known in the art and these devices may be readily adapted to perform the current method. Known devices are described for example in U.S. Pat. No. 8,442, 670; US 2005/0274448; DE202012104243; and EP2674287. Modification of such devices to conform to the teaching of the current disclosure would be possible for one skilled in the art without undue experimentation.

In one embodiment, the residual matter to be removed is a tire release agent. Tire release agents are well known to those skilled in the art, and include silicone release agents, Teflon release agents, and the like.

In the case of a sinusoidal stripe, the period and amplitude are as indicated in the Figures. In various embodiments, the period and amplitude of the sinusoidal stripe are related to the laser beam width used to clean the surface. In one embodiment, the ratio of the amplitude to the laser width ranges from 2.5 to 3.5. In one embodiment, the ratio of period distance to amplitude distance ranges from 1.5 to 2.5.

Generally, more than one pass of the laser over the innerliner surface is used to generate the cleaned innerliner surface. In one embodiment, the step of moving the strip of radiation is repeated sequentially axially across the tread width of the tire to form a plurality of nonlinear circumferential stripes. In one embodiment, the process may be repeated across the tread width of the tire. However, the positioning of each sinusoidal path, for example, may be done so as to offset the undulations of the axially adjacent cleaned paths. In one embodiment, when viewed in the axial direction of the innerliner surface, the peak of a particular stripe may be offset from the peak of an adjacent stripe by one half of the period, thus the peak of one stripe will be positioned at the same circumferential position as the trough of an adjacent stripe.

In one embodiment, a minimum width of uncleaned surface maintained between the adjacent stripes. Thus for example in a sinusoidal pattern where a trough of one stripe and a peak of an axially adjacent stripe are axially aligned in an offset pattern as described above, a minimum distance is maintained. In one embodiment, this minimum axial separation between axially adjacent stripes is 0.5 times the laser width.

While present exemplary embodiments of this invention and methods of practicing the same have been illustrated and described, it will be recognized that this invention may be otherwise variously embodied and practiced within the scope of the following claims.

What is claimed is:

1. A method of cleaning an innermost surface of a pneumatic tire, the surface having a residue deposited thereon, comprising the steps of:
   activating a laser to generate laser radiation;
   directing a pulse of laser radiation to impinge on an area of the innermost surface, the pulse of radiation having a pulse width and a fluence sufficient to remove at least part of the residue in the area to form a cleaned area;
   repeating the step of directing the pulse of radiation sequentially over the innermost surface to form a sequence of cleaned areas, the sequence of cleaned areas defining a stripe, the stripe following a continuous nonlinear path extending at least one circumference about the inner surface, the stripe having a stripe width W2.

2. The method of claim 1, wherein the residual matter comprises at least one of a tire release agent, dirt, and a rubber compound additive.

3. The method of claim 1, wherein the continuous nonlinear path comprises a sinusoidal path having a period and an amplitude.

4. The method of claim 3, wherein the ratio of period distance to amplitude distance ranges from 1.5 to 2.5, and the ratio of the amplitude to the stripe width ranges from 2.5 to 3.5.

5. The method of claim 3, wherein the stripe width ranges from 5 mm to 15 mm.

6. The method of claim 1, wherein the stripe follows a continuous nonlinear path extending for a plurality of circumferential windings about the inner surface, the plurality of circumferential windings extending axially for a predetermined axial width W1.

7. The method of claim 6, wherein each circumferential winding of the stripe is offset in the circumferential direction from its axially adjacent winding of the stripe by one half period distance.

8. The method of claim 6, wherein the minimum axial separation between axial adjacent windings of the stripe is 0.5 times the stripe width.

9. The method of claim 1, wherein the pulse has a cross sectional shape selected from circle and square.

10. The method of claim 1, wherein the pulse has a pulse width ranging from 0.25 to 0.75 mm.

11. The method of claim 1, wherein each cleaned area is adjacent to at least one other cleaned area.

12. The method of claim 1, where each cleaned area overlaps with at least one other cleaned area.

13. The method of claim 1, wherein the axial width W1 corresponds to one of a tread width distance, a shoulder-to-shoulder width distance, and a bead-to-bead distance.

14. The method of claim 1, wherein the fluence ranges from 1 to 3 $J/cm^2$.

* * * * *